(12) United States Patent
Drenth et al.

(10) Patent No.: US 10,046,917 B2
(45) Date of Patent: Aug. 14, 2018

(54) TAKE-UP BEARING FOR SIDE-BY-SIDE CONVEYOR

(71) Applicant: AGCO Corporation, Duluth, GA (US)

(72) Inventors: Mark Jon Drenth, Jackson, MN (US); Jeffrey Michael Zimmerman, Lake Park, IA (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/622,858

(22) Filed: Jun. 14, 2017

(65) Prior Publication Data
US 2018/0002113 A1    Jan. 4, 2018

Related U.S. Application Data

(60) Provisional application No. 62/356,175, filed on Jun. 29, 2016.

(51) Int. Cl.
| | |
|---|---|
| *B65G 23/22* | (2006.01) |
| *B65G 23/00* | (2006.01) |
| *B65G 37/00* | (2006.01) |
| *B65G 41/00* | (2006.01) |
| *A01C 15/00* | (2006.01) |

(52) U.S. Cl.
CPC .......... *B65G 41/003* (2013.01); *A01C 15/003* (2013.01); *A01C 15/006* (2013.01); *B65G 23/22* (2013.01); *B65G 37/00* (2013.01)

(58) Field of Classification Search
None
See application file for complete search history.

(56) References Cited

U.S. PATENT DOCUMENTS

| | | | | |
|---|---|---|---|---|
| 3,104,556 | A | * | 9/1963 | Gossett ................. B65G 23/00 74/397 |
| 3,871,513 | A | * | 3/1975 | Georg ................... B65G 23/00 198/728 |
| 4,773,521 | A | | 9/1988 | Chen |
| 5,052,627 | A | | 10/1991 | Balmer |
| 5,950,933 | A | | 9/1999 | Balmer |
| 8,715,119 | B1 | | 5/2014 | Johnson |

FOREIGN PATENT DOCUMENTS

| | | |
|---|---|---|
| GB | 1212739 A | 11/1970 |
| JP | S5772510 A | 5/1982 |
| JP | H05170310 A | 7/1993 |

OTHER PUBLICATIONS

UK Intellectual Property Office, International Search Report for related UK Application No. GB1613840.6, dated Mar. 1, 2017.

\* cited by examiner

*Primary Examiner* — Kavel Singh (57) ABSTRACT

An assembly includes first and second shafts and first and second sprockets. The first shaft has a first and second ends and a first longitudinal axis of rotation. The first sprocket is attached to the first shaft proximate the first end of the first shaft. The first sprocket rotates with the first shaft. The second shaft is spaced from the first shaft by a distance, the second shaft having a first end spaced from the first end of the first shaft by the distance, a second end spaced from the second end of the first shaft by the distance, and a second longitudinal axis of rotation substantially parallel to the first longitudinal axis of rotation. The second sprocket is attached to the second shaft proximate the second end of the second shaft. The second sprocket rotates with the second shaft. The distance is adjustable.

6 Claims, 11 Drawing Sheets

TAKE-UP BEARING FOR SIDE-BY-SIDE CONVEYOR

CROSS REFERENCE TO RELATED APPLICATION

This application claims the benefit of U.S. Provisional Application No. 62/356,175, filed Jun. 29, 2016, which is hereby incorporated by reference in its entirety.

BACKGROUND OF INVENTION

Field of Invention

In agricultural use, a conventional pneumatic spreader for particulate material such as granular fertilizer includes a tank configured to be pulled across a ground surface in a travel direction.

Description of Related Art

Such a spreader typically has a pair of booms that extend transversely outwardly from the tank, in a lateral direction relative to the travel direction. U.S. Pat. No. 5,052,627, which is hereby incorporated by reference, describes such a conventional spreader. As shown in FIGS. 1 and 3 of the '627 patent, particulate material in tank 10 is conveyed by a pair of belts 28 into guides 60, which feed material through the pipes 13 of booms 12. As shown in FIG. 1, spreader nozzles 18 and 19 allow application of the particulate material to a ground surface over which the spreader travels. A conveyer belt 29 on a right side (as viewed in FIG. 1) of tank 10 feeds into guide 60 to boom 12 on the right side of frame 11. Similarly, a conveyor belt 29 on the left side of tank 10 feeds through guide 60 to a boom on the left side of the frame 11 (not shown).

U.S. Pat. No. 5,950,933, which is hereby incorporated by reference, describes a pneumatic material spreader for distributing two types of particulate materials simultaneously. As shown in FIG. 1 of the '933 patent, tank 10 is divided into two sections by divider wall 19. (column 4, line 47). Belt 46 delivers material from compartment 24 while belt 60 delivers material from compartment 25. As shown in FIGS. 2 and 3 of the '933 patent, a first set of the belts 46 and 60 delivers the first and second materials from compartments 24 and 25, respectively, to right boom 71. Similarly, a second set of the belts 46, 60 delivers materials from compartments 24 and 25 respectively, to a left boom 70.

OVERVIEW OF THE INVENTION

An assembly comprises a first shaft, a first sprocket, and second shaft, and a second sprocket. The first shaft has a first end, a second end, and a first longitudinal axis of rotation. The first sprocket is attached to the first shaft proximate the first end of the first shaft, wherein the first sprocket rotates with the first shaft about the first longitudinal axis of rotation. The second shaft is spaced from the first shaft by a distance, the second shaft having a first end spaced from the first end of the first shaft by the distance, a second end spaced from the second end of the first shaft by the distance, and a second longitudinal axis of rotation that is substantially parallel to the first longitudinal axis of rotation. The second sprocket is attached to the second shaft proximate the second end of the second shaft, wherein the second sprocket rotates with the second shaft about the second longitudinal axis of rotation. The distance is adjustable.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. Moreover, analogous structures may be indexed in increments of one hundred. It is contemplated that all descriptions are applicable to like and analogous structures throughout the several embodiments. In many of the drawing figures, some components are removed for purposes of illustration. However, it is to be understood that the disclosed apparatus has features that are generally symmetrical mirror images (left to right) about line A of FIG. 1.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
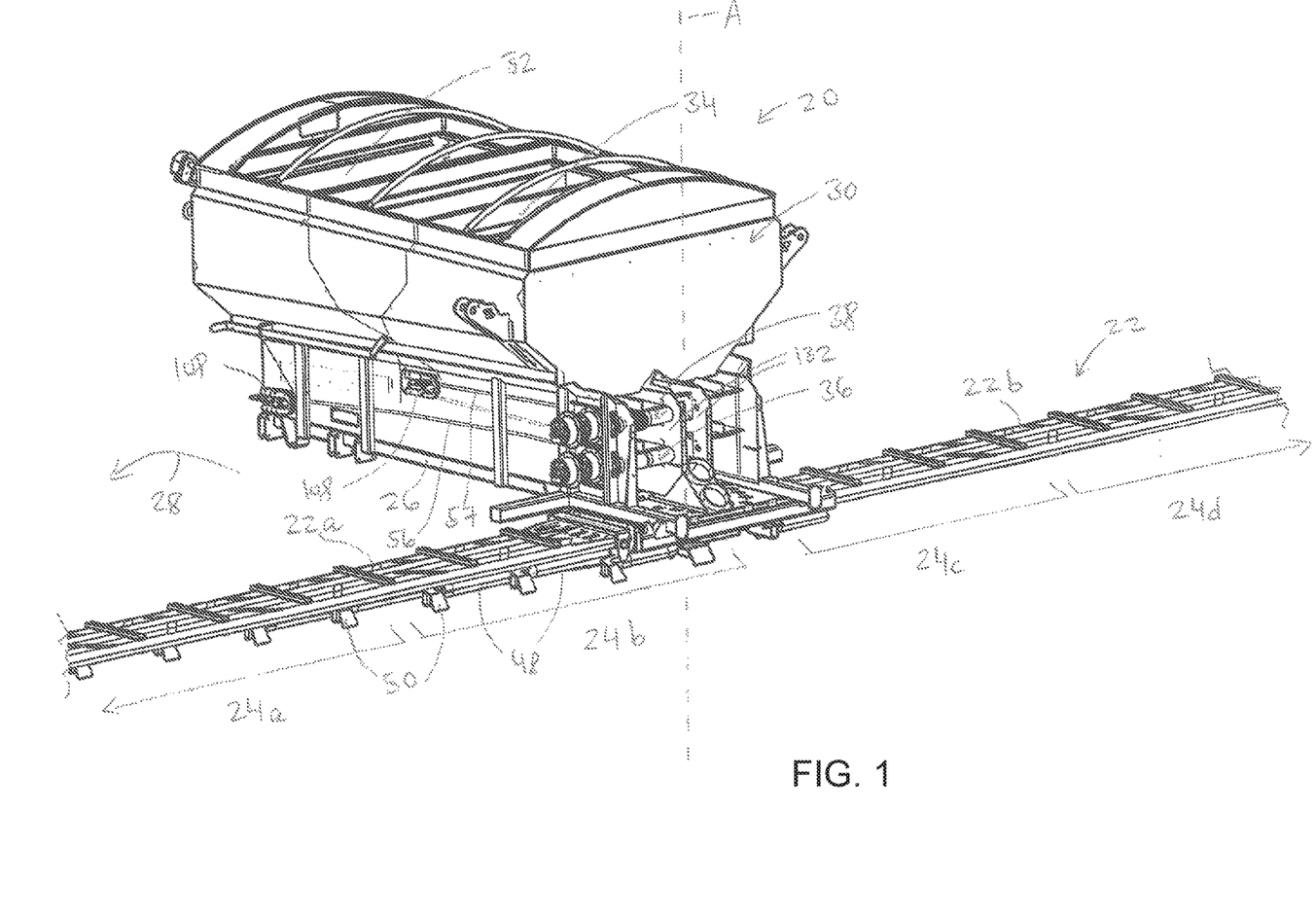
FIG. 1 is a rear isometric view of an exemplary embodiment of a spreader apparatus of the present disclosure.
Figure 2:
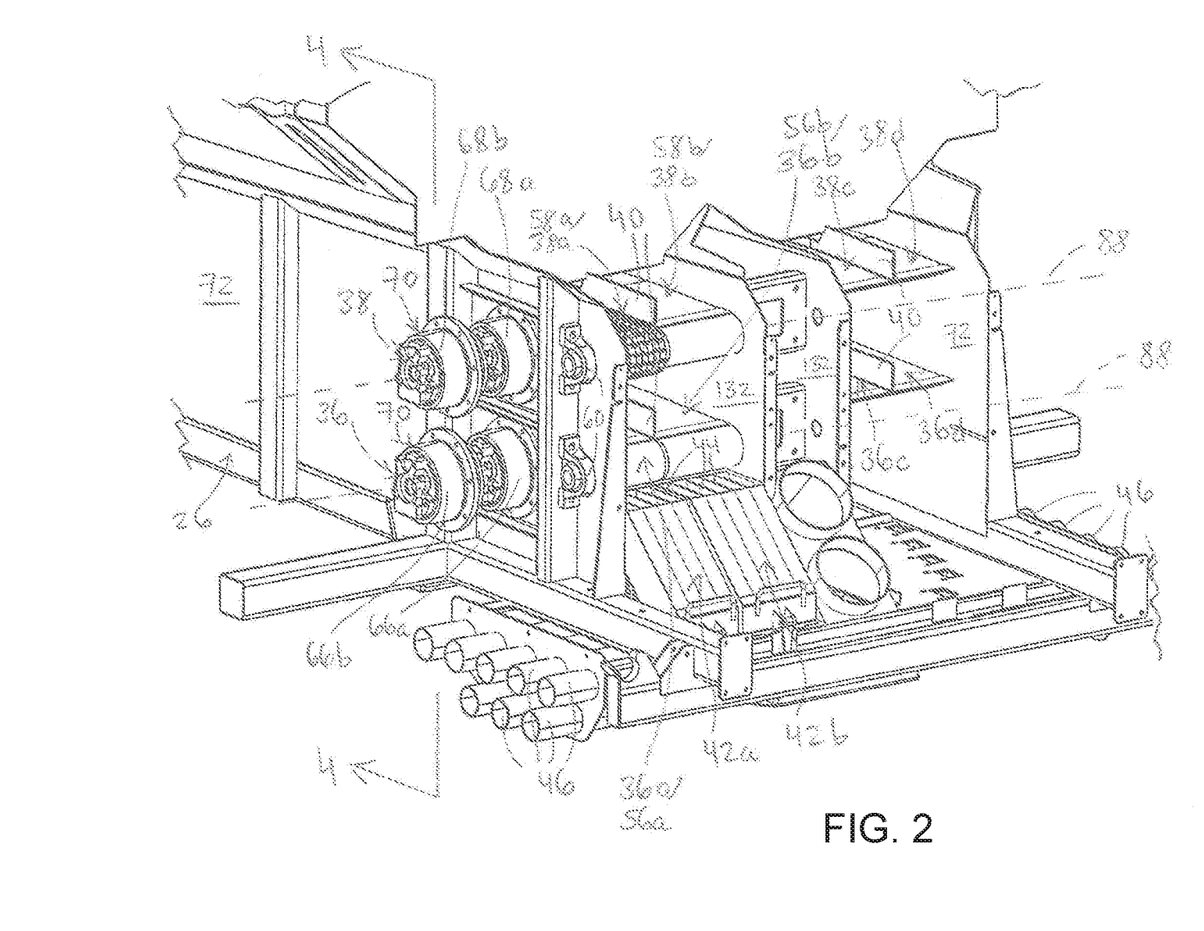
FIG. 2 is a perspective view of a portion of the apparatus of FIG. 1, with the boom removed, showing a distribution guide for a set of lower conveyors.
Figure 3:
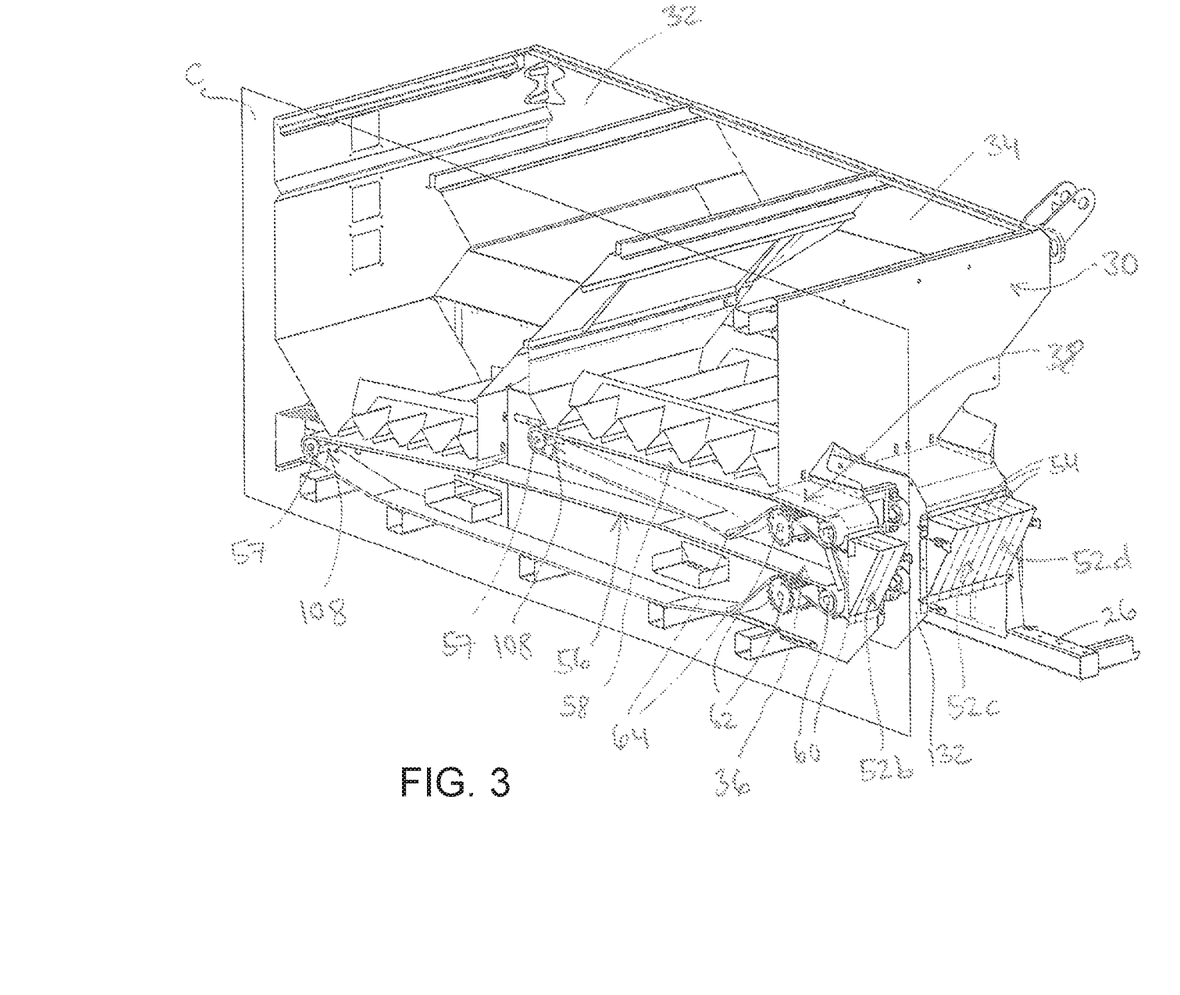
FIG. 3 is a cross-sectional view of the apparatus of FIG. 1, taken along the indicated plane C, and showing distribution guides for the set of upper conveyors.

An exemplary embodiment of agricultural spreader 20 allows for differential particulate application rates of material from tank 30 through different portions of boom 22. As shown in FIG. 1, boom 22 extends outwardly from tank 30 and is configured to distribute the particulate material. As shown in FIGS. 1 and 3, tank 30 includes two compartments 32 and 34 for holding supplies of different particulate materials in a typical application. In another use, the compartments 32 and 34 could hold the same type of particulate material. Lower conveyor assembly 36 delivers material from compartment 32 to boom 22, while upper conveyor assembly 38 delivers particulate material from compartment 34 to boom 22. While the drawing figures show the conveyor assemblies 36, 38 only on a left side of apparatus 20, it is to be understood that similar, mirror-image conveyor assemblies are also provided on a right side of spreader 20. As shown in FIG. 2, in an exemplary embodiment, lower conveyor assembly 36 is divided into respective outward and inward portions 36a, 36b and 36d, 36c. Such outward and inward portions are separated by wall 40; one wall 40 is positioned between outward portion 36a and inward portion 36b; another wall 40 is positioned between outward portion 36d and inward portion 36c. Similarly, upper conveyor assembly 38 is divided into respective outward and inward portions 38a, 38b and 38d, 38c. Such outward and inward portions are separated by wall 40; one wall 40 is positioned between outward portion 38a and inward portion 38b; another wall 40 is positioned between outward portion 38d and inward portion 38c.

Boom 22 includes boom portions 24a-24d along a longitudinal extent thereof. Left boom arm 22a includes boom portions 24a and 24b; right boom arm 22b includes boom portions 24c and 24d. Referring to FIGS. 1-3 (as partially illustrated), for distribution of particulate material from compartment 32 of tank 30, lower conveyor belt 56a on lower conveyor side 36a is associated with boom portion 24a; lower conveyor belt 56b on lower conveyor side 36b is associated with boom portion 24b; lower conveyor belt 56c on lower conveyor side 36c is associated with boom portion 24c; and lower conveyor belt 56d on lower conveyor side 36d is associated with boom portion 24d. For distribution of particulate material from compartment 34 of tank 30, upper conveyor belt 58a on upper conveyor side 38a is associated with boom portion 24a; upper conveyor belt 58b on upper conveyor side 38b is associated with boom portion 24b; upper conveyor belt 58c on upper conveyor side 38c is associated with boom portion 24c; and upper conveyor belt 58d on upper conveyor side 38d is associated with boom portion 24d.

In an exemplary embodiment, the particulate application rates can be different for each of the materials from compartments 32 and 34 between different sections 24a through 24d, for example, along the longitudinal extent of boom 22. A separate motor 66a-66d and 68a-68d is associated with each of the lower and upper conveyor belts 56a-56d and 58a-58d, each motor 66a-66d and 68a-68d being configured to independently control a distribution rate of the particulate material on its respective conveyor belts 56a-56d and 58a-58d and through its respective boom portion 24a-24d.

For example, as shown in FIG. 1, if spreader 20 travels across a ground surface so that it turns in leftward turn direction 28, the leftmost boom portion 24a will travel at the slowest speed relative to the other boom portions, and the rightmost boom portion 24d will travel at the highest rate of speed while traversing the turn 28. Accordingly, in order to uniformly spread particulate material on a ground surface below the entire boom structure 22, particulate material should be deposited to the ground surface at a faster application rate in boom portion 24d as compared to that in boom portion 24a. Moreover, particulate application rates through boom portions 24b and 24c should be prorated between the speed extremes at boom portions 24a and 24d to ensure a uniform application of particulate material to the ground surface across the entire width of spreader 20.

Material moved on a conveyor side 36a falls by gravity into lower guide 42a. Similarly, material moved by lower conveyor side 36b falls by gravity into lower guide 42b. Each of lower guides 42a, 42b includes a plurality of compartments 44, each of the compartments 44 fluidly connected to one of outlets 46. Each of the outlets 46 is in turn connected to a boom pipe 48, which has a spreader nozzle 50 at its terminus.

Referring to FIGS. 2 and 3, material moved by upper conveyor side 38*a* is fed by gravity to upper guide 52*a* (not shown, as it is positioned to the left of the cross-sectional plane C); material fed by upper conveyor side 38*b* falls by gravity into upper guide 52*b*. Material conveyed by upper conveyor side 38*c* falls by gravity into upper guide 52*c*, and material conveyed by upper conveyor side 38*d* falls by gravity into upper guide 52*d*. As with lower guide 42, each of the compartments 54 of upper guide 52 are in fluid communication with an outlet 46, which in turn allows particulate material to travel through boom pipes 48 to spreader novels 50. While such boom pipes 48 and spreader nozzles 50 are not shown on the right boom arm 22*b* of FIG. 1, it is to be understood that they are provided similarly as shown on the left boom arm 22*a*.

In an exemplary embodiment, material flow on each of the lower and upper conveyor sides 36*a*, 36*b*, 36*c*, 36*d*, 38*a*, 38*b*, 38*c* and 38*d* is independently controlled by a separate motor. In an exemplary embodiment, material moved by conveyor sides 36*a* and 38*a* through lower guide 42*a* and upper guide 52*a* are applied to the ground surface beneath spreader 20 by nozzles 50 on boom portion 24*a*. Similarly, material moved on lower conveyor side 36*b* and upper conveyor side 38*b* through lower guide 42*b* and upper guide 52*b*, respectively, are applied to the ground surface through nozzles 50 on boom portion 24*b*. In a like manner, material moved on lower conveyor side 36*c* and upper conveyor side 38*c* through lower guide 42*c* and upper guide 52*c*, respectively, are applied to a ground surface through nozzles 50 on boom portion 24*c*. Moreover, material moved on lower conveyor side 36*d* and upper conveyor side 38*d* through lower guide 42*d* and upper guide 52*d*, respectively, are applied to the ground surface through nozzles 50 positioned on boom portion 24*d*. Because a rate of particulate material flow through each of the upper and lower conveyor sides 36*a*-*d* and 38*a*-*d* is independently controlled by a corresponding number of individual conveyor belt motors, a rate of delivery of material through each of the boom portions

24a, 24b, 24c and 24d can be independently controlled for each of the particulate materials in compartments 32 and 34 of tank 30.

Thus, in an exemplary use where spreader 20 navigates a left-hand turn 28, the flow of material through boom portion 24a can be controlled to be applied at a slowest relative rate, the flow of material through boom portion 24b controlled to be applied at a higher speed than through boom portion 24a, a rate of particulate application through boom portion 24c can be controlled to be administered at a still higher rate of speed than through boom portion 24b; and a relative application rate of materials through boom portion 24d can be controlled to be at the highest speed relative to the other boom portions 24a-24c.

While a particular situation is described herein, it is to be understood that the differential particulate application rates of the two materials from compartments 32 and 34 through boom portions 24a-24d can be varied to take into account other movements of apparatus 20 over a ground surface. Such differential speed control of the motors 66a-66d and 68a-68d (further described below) of lower conveyor assembly 36 and upper conveyor assembly 38, respectively, can be automated through the use of computer controllers and global positioning system (GPS) devices. The differential application speed control through different portions 24a-24d of booms 22 can also receive inputs from steering apparatuses and/or other input devices that sense or react to the direction and rate of travel of spreader 20 over a ground surface. Moreover, computer and GPS devices can be programmed to take into account the location of previous application passes so that certain motors can be turned off or their speed of application decreased, to stop or slow application through a particular one or selected boom portions 24a-d, thus preventing over-application when spreader 20 travels over a particular parcel of the ground surface more than once. Additionally, spreader 20 may also be programmed or otherwise configured for map based particulate application; for example, each boom section can apply particulate material to the ground surface at a different rate based on a prescription map of the field.

While a particular configuration of spreader 20 is illustrated and described, having four boom sections 24a-d and four corresponding sections of each of lower conveyor assembly 36 and upper conveyor assembly 38, it is to be understood that the disclosed concepts can be readily expanded to provide for differential application rates through more or fewer boom sections or portions. Moreover, while a particular correlation of conveyor sections to boom portions is described, it is understood that the guides 42, 52, pipes 48, nozzles 50 and boom portions can be set up differently to provide for other correlations between the conveyor sections and the locations of material application to a ground surface under spreader 20.

While not illustrated, it is to be understood that apparatus 20 is typically provided with ground engaging elements such as wheels or a track that allow spreader 20 to travel across a ground surface in a direction generally perpendicular to the longitudinal orientation of boom 22. In one typical use, spreader 20 is pulled behind another agricultural implement, such as a tractor. In other configurations, spreader 20 is self-propelled on its own chassis.

Figure 4:
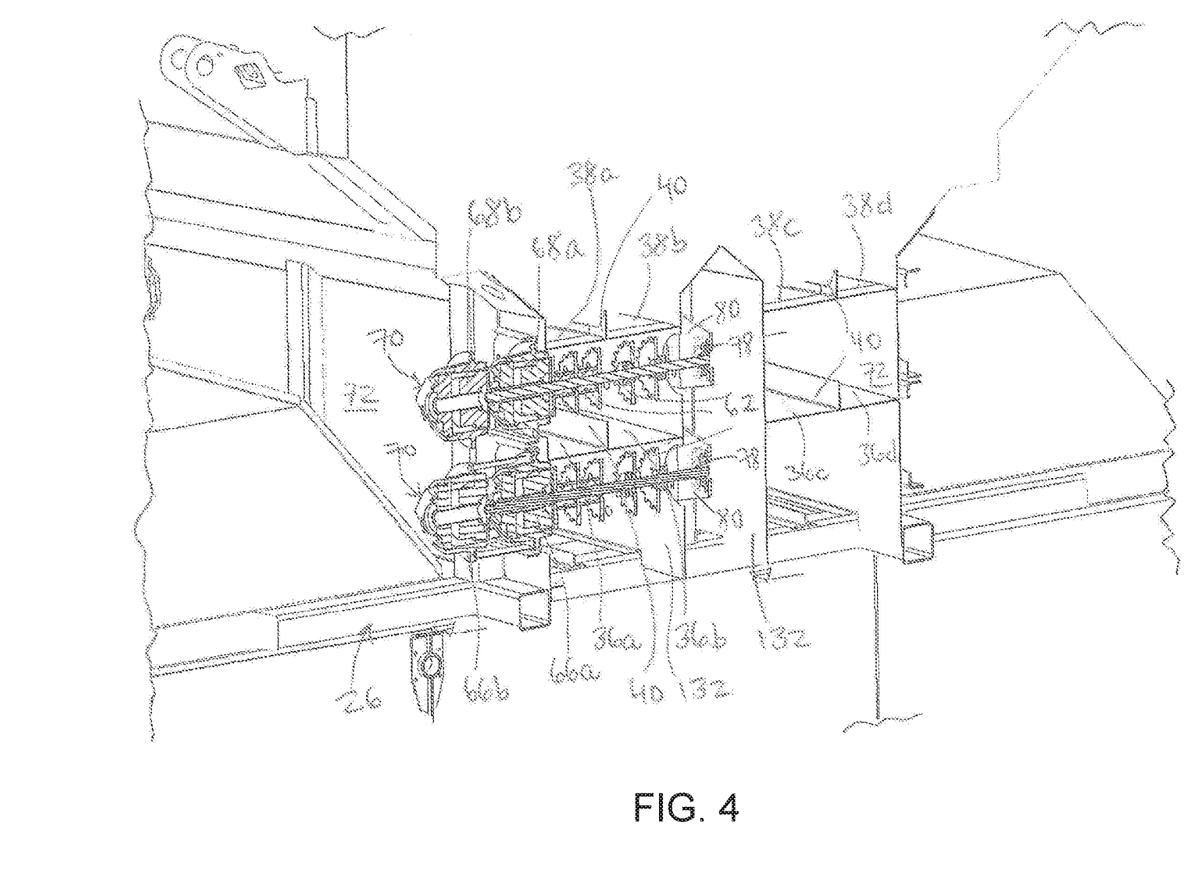
FIG. 4 is a vertical cross-sectional view, taken along line 4-4 of FIG. 2, of a portion of the exemplary spreader apparatus.

As shown in FIG. 3, in an exemplary embodiment, each of lower and upper conveyor assemblies 36, 38 includes endless conveyor belt 56, 58 that is configured to move (in a clockwise direction as viewed in FIG. 3) around sprocket 57, roller 60, drive sprocket 62 and tension rod 64. As shown in FIGS. 2 and 4, in an exemplary embodiment, of spreader 20, lower motor 66a controls the speed of particulate material moved on lower conveyor side 36a; lower motor 66b controls the speed of material conveyed on lower conveyor 36b; upper motor 68a controls the speed of material moving an upper conveyor side 36a; and upper motor 68b controls the speed of material moving on upper conveyor side 38b. As shown in FIG. 2, a portion of an outward conveyor 56a, 58a is aligned side-by-side with a portion of a corresponding inward conveyor 56b, 58b in a plane substantially parallel to the longitudinal axis 88. While not specifically illustrated in FIGS. 1-4, it is to be understood that mirror image motor shaft assemblies 70 are also provided for the right side conveyor portions 36c, 36d, 38c and 38d.

Figure 5:
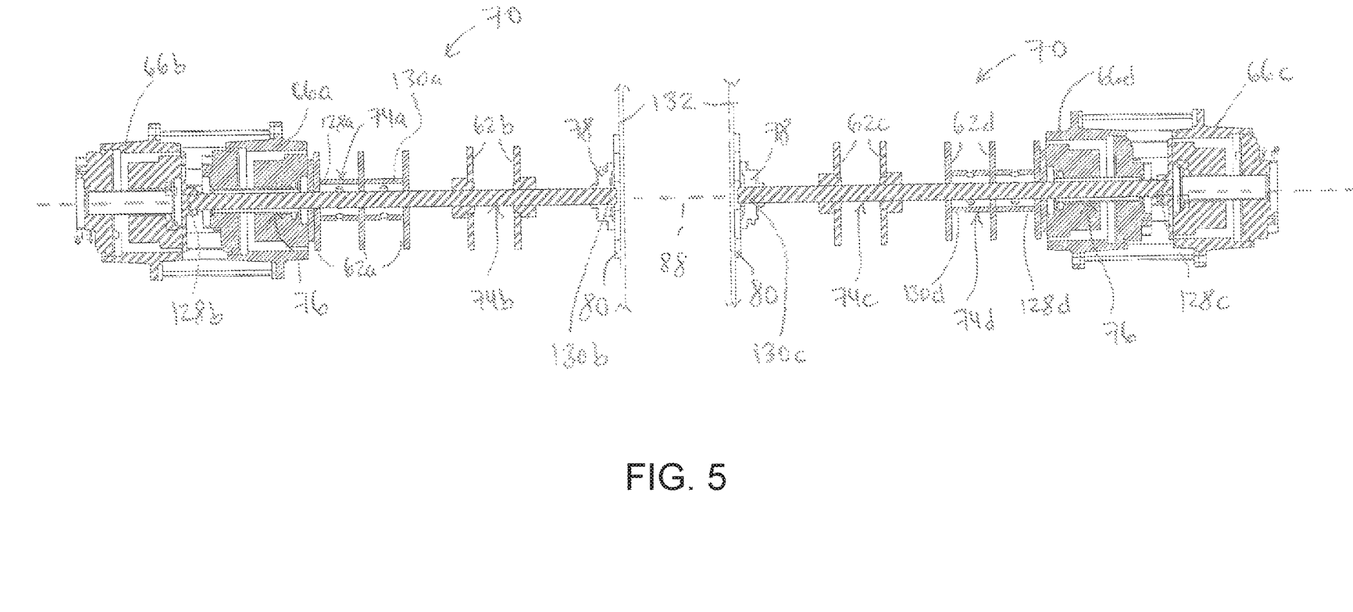
FIG. 5 is a cross-sectional view of a motor shaft assembly for the lower conveyor assembly, as shown in FIG. 4, and additionally of a second mirror image motor shaft assembly of the lower conveyor assembly, not shown in FIG. 4.

FIG. 5 is a cross-sectional view of two longitudinally aligned motor shaft assemblies 70, as would be used for either the lower conveyor assembly 36 or the upper conveyor assembly 38. While the components in FIG. 5 are numbered for the lower conveyor assembly 36, it is be understood that the motor shaft assemblies 70 can also be used in upper conveyor assembly 38. FIGS. 2 and 4 show two motor shaft assemblies 70, one each on the left side of lower conveyor assembly 36 and on the left side of upper conveyor assembly 38. It is to be understood that motor shaft assemblies 70 for the right side of lower conveyor assembly 36 and of upper conveyor assembly 38 are installed as mirror image structures, compared those illustrated in FIGS. 2 and 4.

As shown in FIG. 5, in an exemplary embodiment, first motor shaft 74a has a first end 128a and a second end 130a. First motor 66a is attached to first end 128a of first motor shaft 74a. First motor 66a is configured to rotate first motor shaft 74a about longitudinal axis 88. First motor shaft 74a and first motor 66a have longitudinal bore 76 therethrough. Second motor shaft 74b has a first end 128b and a second end 130b. A portion of second motor shaft 74b is positioned in longitudinal bore 76. Second motor 66b is attached to first end 128b of second motor shaft 74b. Second motor 66b is configured to rotate second motor shaft 74b about longitudinal axis 88. On a right side of FIG. 5, third motor shaft 74d has a first end 128d and a second end 130d. Third motor 66d is attached to first end 128d of third motor shaft 74d. Third motor 66d is configured to rotate third motor shaft 74d about longitudinal axis 88. Third motor shaft 74d and third motor 66d have longitudinal bore 76 therethrough. Fourth motor shaft 74c has a first end 128c and a second end 130c. A portion of fourth motor shaft 74c is positioned in longitudinal bore 76. Fourth motor 66c is attached to first end 128c of fourth motor shaft 74c. Fourth motor 66c is configured to rotate fourth motor shaft 74c about longitudinal axis 88.

Motor 66a is attached to housing side wall 72 of spreader 20 (shown in FIGS. 2 and 4). Motor shaft 74a of motor 66a carries drive sprockets 62a, which couple with endless drive conveyor belt 56a in a known manner. Motor shaft 74b of motor 66b extends through bore 76 in motor 66a and motor shaft 74a. Second end 130b of motor shaft 74b is attached to bearing 78, positioned on bracket 80 connected to housing wall 132, shown in FIGS. 2 and 4. Motor 66d is attached to housing side wall 72 of spreader 20. Motor shaft 74d of motor 66d carries drive sprockets 62d, which couple with endless drive conveyor belt 56d in a known manner. Motor shaft 74c of motor 66c extends through bore 76 in motor 66d and motor shaft 74d. Second end 130c of motor shaft 74c is attached to bearing 78, positioned on bracket 80 connected to housing wall 132, shown in FIGS. 2 and 4. The use of only a single bearing 78 for each motor shaft assembly 70 reduces lubrication requirements and wear points.

In an exemplary embodiment, enough clearance is provided around second motor shaft 74*b* through bore 76 that no physical contact is made between second motor shaft 74*b* and first motor 66*a* or first motor shaft 74*a*. Such an arrangement eliminates a need for bearings between motor shaft 74*b* and motor 66*a* or its motor shaft 74*a*. In effect, motor shaft 74*a* is cantilevered from motor 66*a* and is not supported on motor shaft 74*b*. Motor shaft 74*b* is turned by motor 66*b* and carries drive sprockets 62*b*, on which endless belt 56*b* moves. Moreover, enough clearance is provided around third motor shaft 74*c* through bore 76 that no physical contact is made between third motor shaft 74*c* and fourth motor 66*d* or fourth motor shaft 74*d*. Such an arrangement eliminates a need for bearings between motor shaft 74*c* and motor 66*d* or its motor shaft 74*d*. In effect, motor shaft 74*d* is cantilevered from motor 66*d* and is not supported on motor shaft 74*c*. Motor shaft 74*c* is turned by motor 66*c* and carries drive sprockets 62*c*, on which endless belt 56*c* moves. An exemplary suitable motor is available commercially from Poclain Hydraulics under compact motor model MK04. However, it is contemplated that other motors for rotationally driving a shaft are also suitable, including motors driven electrically, pneumatically, and by other methods.

As shown in FIG. 2, outward and inward conveyor belts 56*a* and 56*b* are separate, and outward and inward conveyor belts 58*a* and 58*b* are separate, and are thereby able to carry particulate material at different rates of speed. While not shown but described in this written description, inward and outward conveyor belts 56*c* and 56*d* are also separate, and inward and outward conveyor belts 58*c* and 58*d* are separate, and are thereby able to carry particulate material at different rates of speed. In an exemplary embodiment, portions of conveyor belts 56*a*, 56*b*, 56*c*, 56*d* are aligned side-by-side in a lower plane parallel to longitudinal axis 88 of lower conveyor assembly 36; and portions of conveyor belts 58*a*, 58*b*, 58*c*, 58*d* are aligned side-by-side in an upper plane parallel to longitudinal axis 88 of upper conveyor assembly 38.

Figure 11:
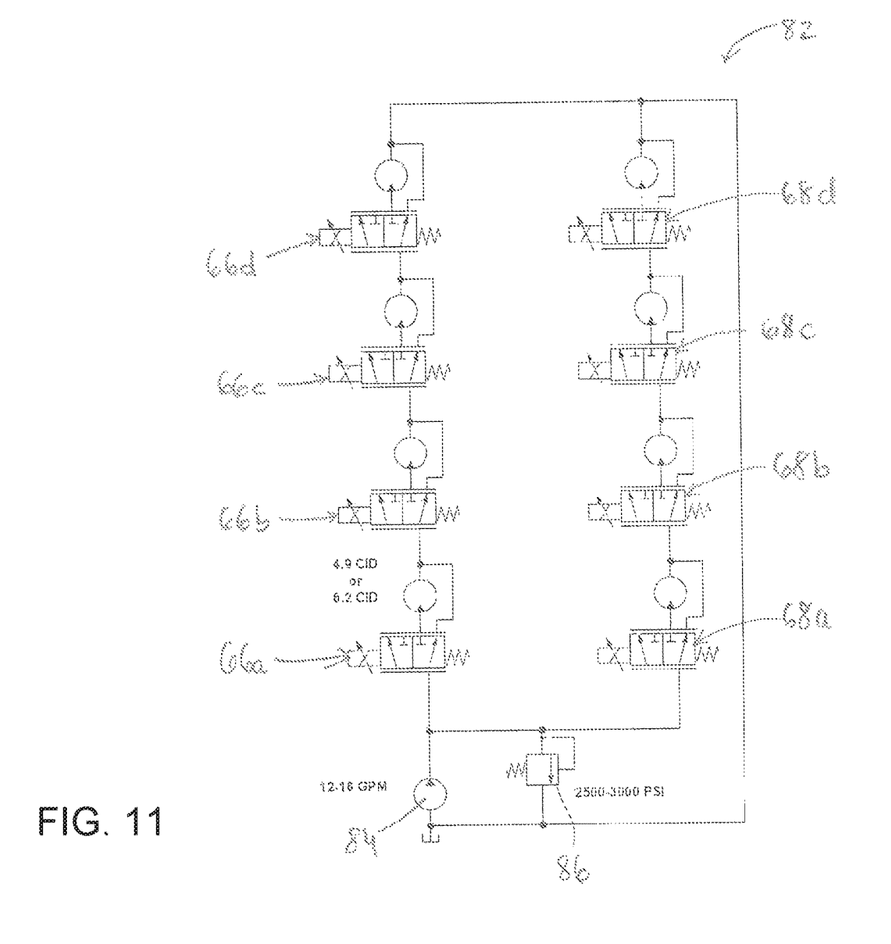
FIG. 11 is an exemplary hydraulic schematic for operation of the motors in the exemplary embodiment of the apparatus shown in FIGS. 1-4.

FIG. 11 shows a schematic diagram of an exemplary hydraulic circuit 82 for the operation of motors 66*a*-66*d* for control of the speed of material application through lower conveyor sides 36*a*-36*d*, respectively. Hydraulic circuit 82 also shows the use of motors 68*a*-68*d* for control of material application motion rates through upper conveyor sides 38*a*-38*d*, respectively. In an exemplary embodiment, the hydraulic system used in spreader 20 and depicted in diagram 82 is a hybrid of series and parallel connections for hydraulic fluid from pump 84. Referring to FIG. 3, in an example, if particulate material is to be conveyed only from compartment 32 of tank 30 and not compartment 34, then upper motors 38*a*-38*d* will be turned off and only lower motors 66*a*-66*d* will receive hydraulic fluid from pump 84. Moreover, in an example where, with reference to FIG. 1, boom portion 24*a* is to pass over an area of the ground that has already received an application of particulate matter, motor 66*a* can be turned off so that fluid from pump 84 bypasses motor 66*a*, thereby operating motors 66*b*-66*d* to allow for application of particulate material from conveyor sides 36*b*, 36*c* and 36*d* through nozzles 50 of boom portions 24*b*, 24*c* and 24*d*. In an exemplary circuit 82 depicted in FIG. 11, a relief valve 86 is provided for excess hydraulic fluid that is not used by the connected motors 66, 68. In an exemplary embodiment, flow can be modulated through each of the motors 66, 68 to provide for an infinitely variable speed of rotation of connected motor shafts 74 between off and maximum speed extremes. Thus, precise control of the rate of application of particulate material from each compartment 32, 34 can be controlled independently at each of boom portions 24*a*-24*d*.

As shown in FIG. 5, motor shaft 74*a* and motor shaft 74*b* are co-axial, in that they rotate about a common longitudinal axis 88. Moreover, motor shaft 74*c* and motor shaft 74*d* are co-axial. However, the shafts are independently controlled by their respective motors 66*a*-66*d* and thereby independently drive their respectively connected conveyor belt sides 56*a*-56*d*. This configuration allows for independent driving of the adjacent conveyor belt sides 56*a*, 56*b* and 56*c*, 56*d* in a small amount of space, and with few required bearings. Independent speed control of the motor shafts 74*a*-74*d* and their corresponding conveyor sides 56*a*-56*d* permit variable rate application of the particulate material conveyed thereon, as well as sectional control of the variable rate application, with application rates for the separate materials of compartments 32 and 34 at each boom portion 24*a*-24*d* being independently controllable.

The series and bypass valve arrangements of circuit 82 (FIG. 11) reduce flow requirements for pump 84 while still allowing for independent control of each motor 66*a*-*d* and 68*a*-*d*. At each valve corresponding to each of the individual motors, whatever hydraulic fluid flow is not directed through that motor will flow to the next motor. In this way, all of the hydraulic fluid flow is available to each motor in each series portion of the circuit, thereby allowing for independent control of each of the individual motors. The illustrated circuit 82 has two parallel branches; one for lower motors 66*a*-*d* and another for upper motor 68*a*-*d*. With this arrangement, each of the first motors 66*a*, 68*a* in the parallel branches encounters a reduced pressure load, as compared to a circuit in which all of the motors are arranged in series with each other.

Figure 6:
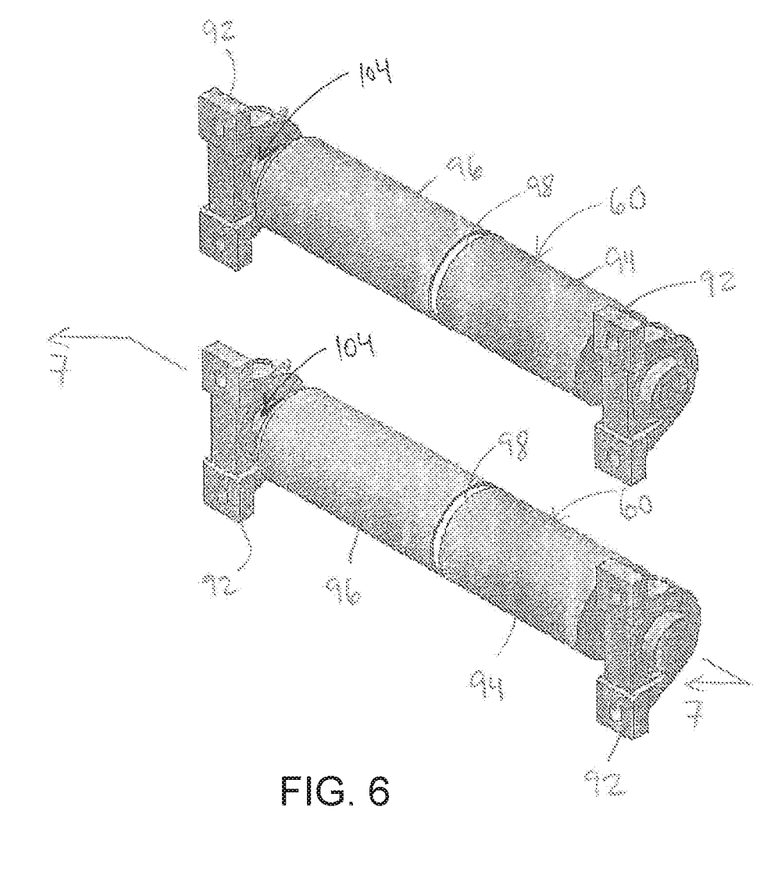
FIG. 6 is a front perspective view of a pair of rollers for upper and lower conveyors belts.
Figure 7:
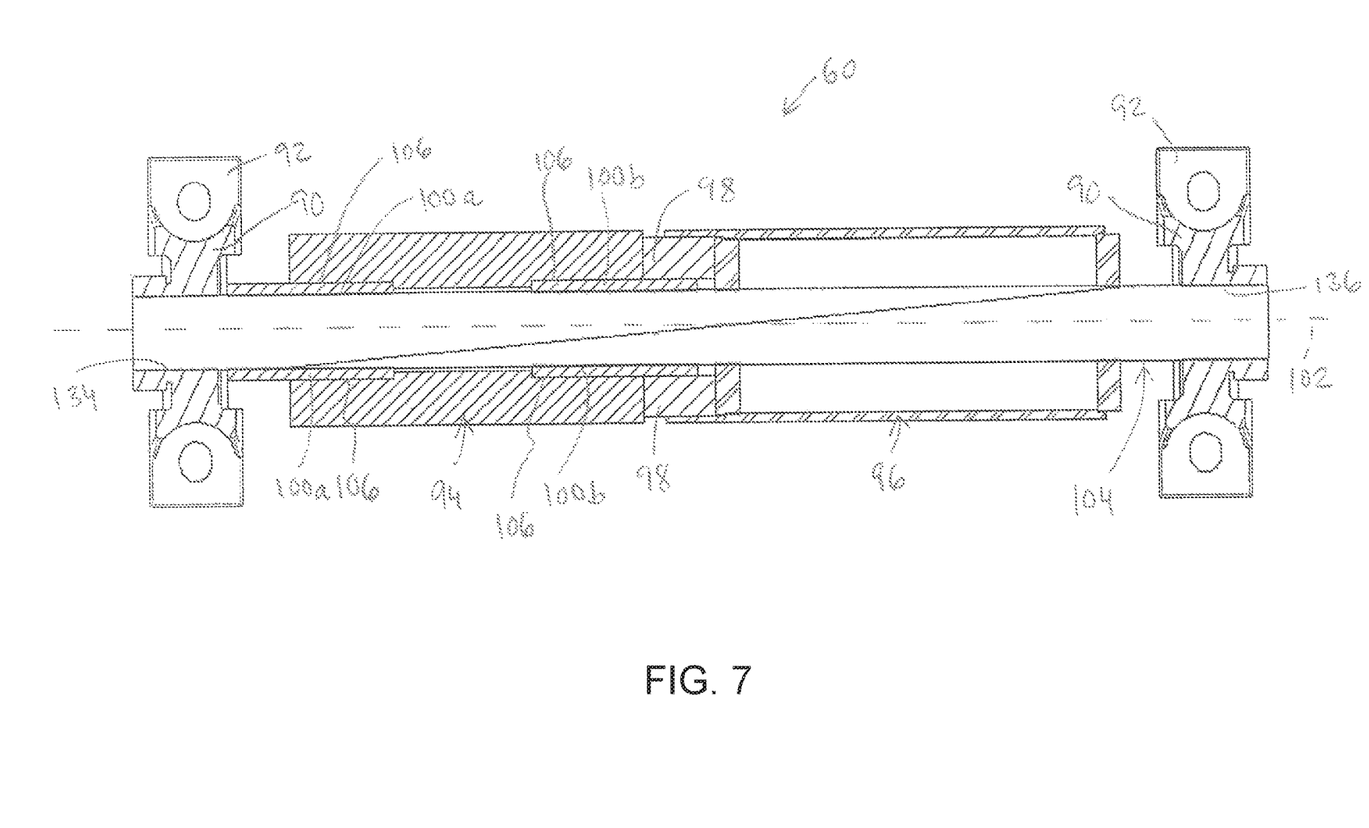
FIG. 7 is a cross-sectional view of a roller of FIG. 6, taken along line 7-7 of FIG. 6.

As shown in FIGS. 2, 3 and 6, conveyor belts 56, 58 travel around rollers 60, allowing particulate material on a top surface of conveyor belt 56, 58 to fall into compartments 44, 54 of guides 42, 52. FIG. 6 shows front perspective views of the upper and lower rollers 60, removed from spreader 20. FIG. 7 is a vertical cross-sectional view of one of the rollers 60 through section line 7-7 of FIG. 6. As shown in FIG. 7, roller 60 includes shaft 104 having first end 134, second end 136, and longitudinal axis of rotation 102. Inward barrel 96 surrounds a first portion of shaft 104 and is fixed to shaft 104 to rotate therewith. Outward barrel 94 surrounds a second portion of shaft 104 and is configured to rotate about axis 102 independent of a rotation of shaft 104. Outward barrel 94 is spaced from inward barrel 96 along axis 102. Spacer 98, in block or annular form, is positioned to at least partially surround shaft 102 and is positioned between inward barrel 96 and outward barrel 94.

External bearings 90 are provided at each of mounting brackets 92. In an exemplary embodiment, each external bearing 90 is positioned within the respective mounting bracket 92 and accepts an end 134, 136 of shaft 104. Roller 60 includes outward barrel 94, around which outward conveyor belt 56*a*, 56*d*, 58*a* or 58*d* partially wraps and inward barrel 96, around which inward conveyor belt 56*b*, 56*c*, 58*b* or 58*c* partially wraps. Spacer 98 separates the outward barrel 94 and the inward barrel 96 and is formed in an exemplary embodiment of a durable polymer material. Annular bearings 100, such as formed from composite materials, are provided to allow outward barrel 94 and inward barrel 96 to rotate independently about a common longitudinal access 102 of shaft 104. An annular bearing 100 is positioned at least partially between the shaft 104 and the spacer 98. In an exemplary embodiment, spacer 98 also serves as a seal to keep fertilizer, debris, and other material away from bearing 100b. Additional seals (e.g., o-rings or lip seals) can also be integrated into spacer 98 to improve its performance. Moreover, annular bearing 100 is positioned at least partially between the shaft 104 and the outward barrel 94.

Outward barrel 94 and inward 96 are configured to rotate independently from each other. Each of outward barrel 94 and inward 96 rotate at a speed determined by the rate of movement of its corresponding conveyor belt 56a-d, 58a-d, respectively. In an exemplary embodiment, common shaft 104 rotates on external bearings 90. In an exemplary embodiment, inward barrel 96 is welded or otherwise fixedly attached directly to shaft 104, to rotate therewith on the main external bearings 90. In an exemplary embodiment, inward barrel 96 is substantially hollow to reduce a total weight of roller 60.

Outward barrel 94 is free to rotate on shaft 104 at a different speed than inward barrel 96 by means of annular bearings 100. In an exemplary embodiment, annular bearings 100 are press fit into machined recesses 106 on an internal surface of outward barrel 94. In an exemplary embodiment, spacer 98 is formed of a wear resistant polymer, possibly an ultrahigh molecular weight polymer, and is located between outward barrel 94 and inward barrel 96. Spacer 98 provides a seal and a wear resistant element between the barrels 94, 96. In the illustrated embodiment, outward annular bearing 100a is positioned proximate end 134 and extends to mounting bracket 92. This prevents particulate material from entering that end of bearing 100a and also constrains motion of bearing 100a in a leftward direction as viewed in FIG. 7. Moreover, spacer 98 prevents rightward or inward motion of outward barrel 94 along shaft 104. In the illustrated structure, because bearings 100a and 100b will wear at essentially identical rates, no angular misalignment will result from a change in the thickness of the annular bearings 100a,b due to wear. In an exemplary embodiment, annular bearings 100 are sealed, maintenance free composite bearings that do not require lubrication. In another embodiment, ball bearings or other bearings could be used instead of composite bearings; however, such ball bearings would require regular lubrication. While an exemplary configuration of roller 60 is illustrated and described, it is contemplated that roller 60 may be constructed differently than shown. For example, the outward barrel may be fixed to shaft 104 and the inward barrel may rotate independently of shaft 104.

Figures 8A, 8B:
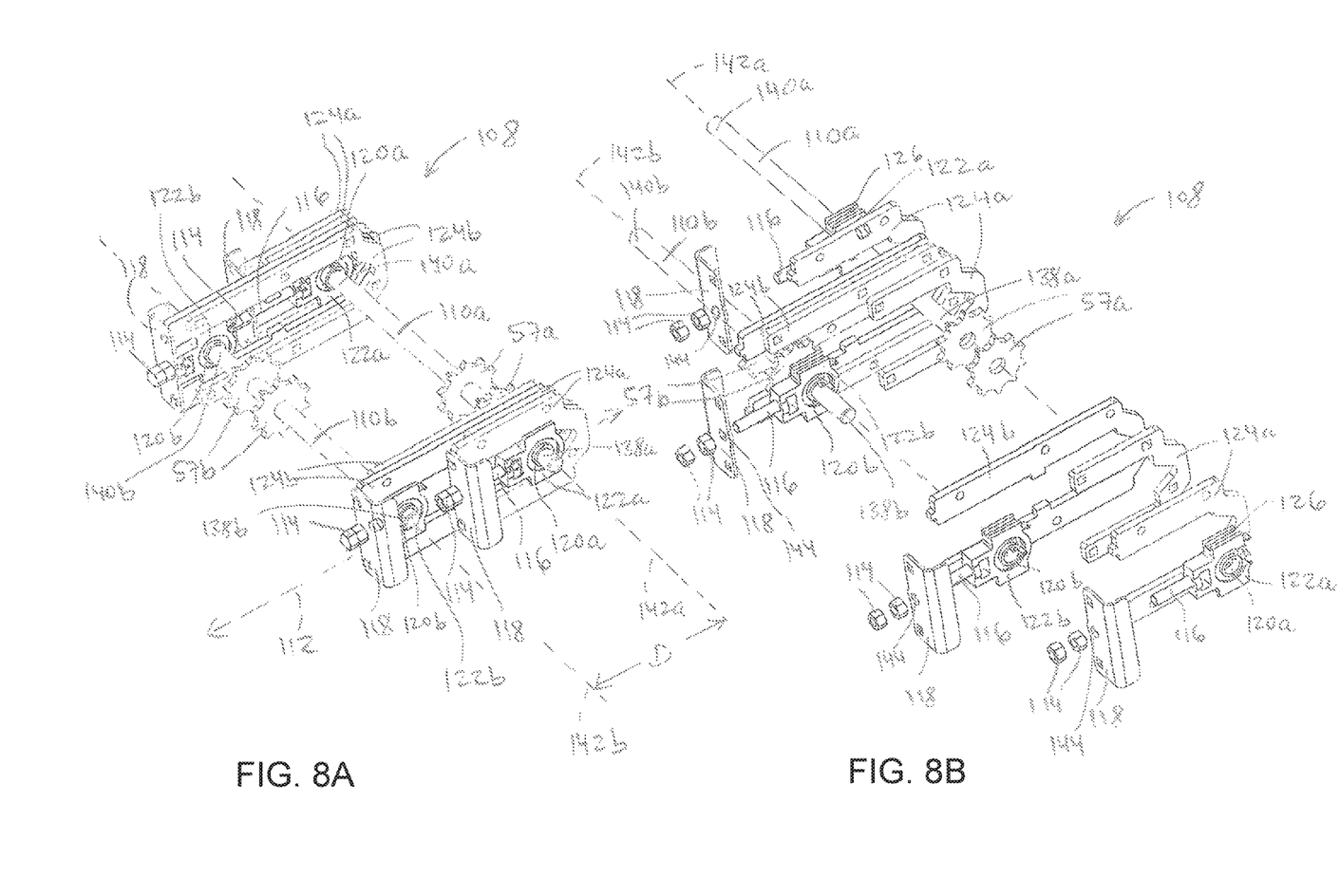
FIG. 8A is a perspective view of an exemplary take-up bearing assembly.
FIG. 8B is a partially exploded view of the take-up bearing assembly of FIG. 8A.
Figure 9:
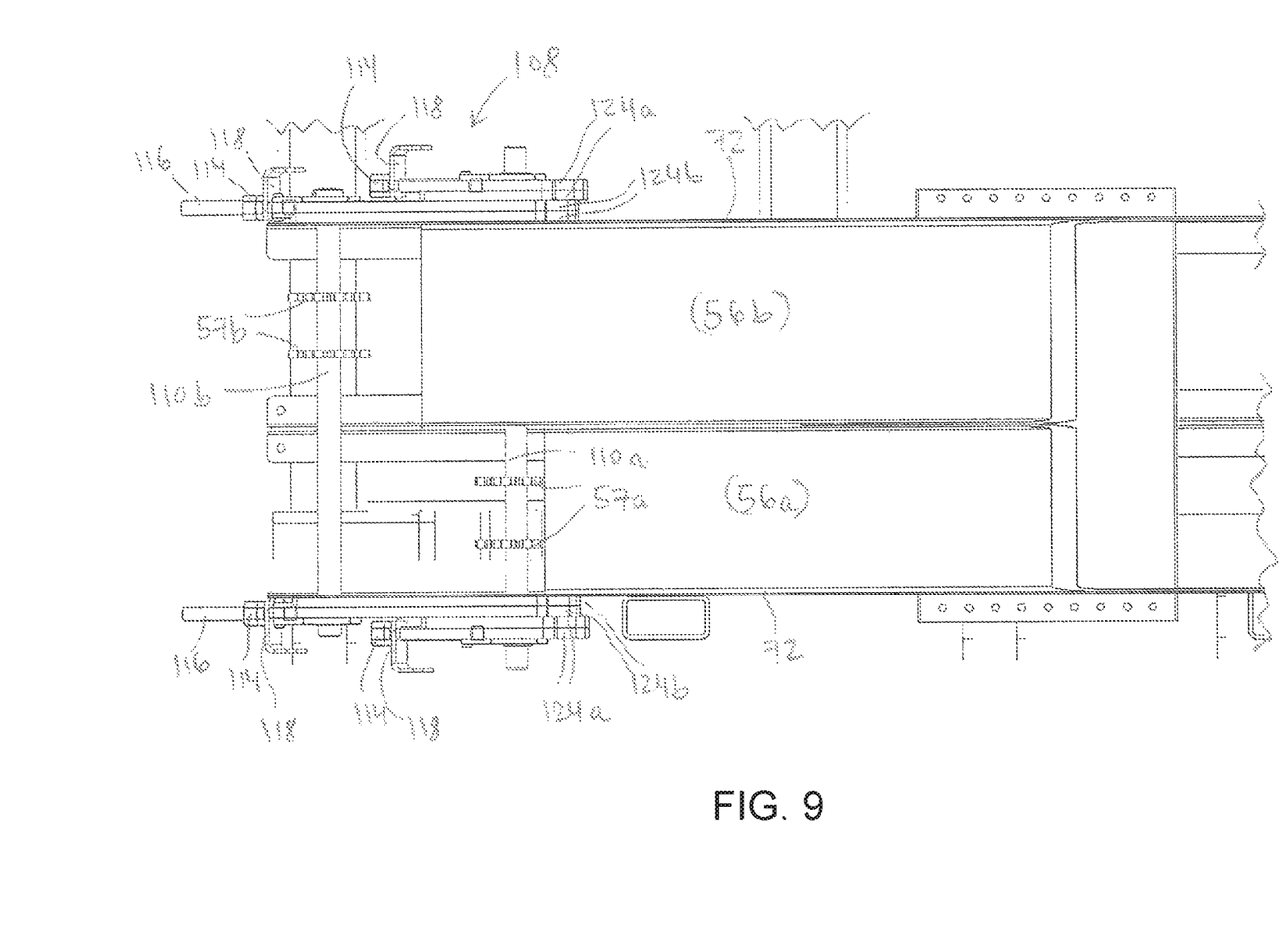
FIG. 9 is a top view of the take-up bearing assembly of FIGS. 8A and 8B installed on the spreader.

As shown in FIGS. 1, 3 and 8A-9, take-up bearing assembly 108 is provided near a forward end of each conveyor belt 56, 58 and contains sprockets 57, around which conveyor belts 56, 58 travel. While FIG. 9 is labeled for lower conveyor assembly 36, it is to be understood that the descriptions also apply to upper conveyor assembly 38. Outward conveyor belt 56a partially wraps and travels around sprockets 57a, and inward conveyor belt 56b partially wraps and travels around sprockets 57b. Each of sprockets 57 is attached to bearing shaft 110 to rotate therewith. First bearing shaft 110a has first end 138a, second end 140a, and first longitudinal axis of rotation 142a. Sprockets 57a are attached to first bearing shaft 110a proximate first end 138a of first bearing shaft 110a. Sprockets 57a rotate with first bearing shaft 110a about first longitudinal axis of rotation 142a. Second bearing shaft 110b is spaced from first bearing shaft 110a by a distance D along directions 112. Second bearing shaft 110b has first end 138b spaced from first end 138a of first bearing shaft 110a by distance D and a second end 140b spaced from second end 140a of first bearing shaft 110a by distance D. Second longitudinal axis of rotation 142b of second bearing shaft 110b is substantially parallel to first longitudinal axis of rotation 142a of first bearing shaft 110a. Sprockets 57b are attached to second bearing shaft 110b proximate second end 140b of second bearing shaft 110b. Sprockets 57b rotate with second shaft 110b about second longitudinal axis of rotation 142b.

As conveyor belts 56a, 56b change in length due to wear, shafts 110a and 110b of take-up bearing assembly 108 can be moved relative to other structures of spreader 20 in directions 112 to take up slack in the respective belt or belts 56a, 56b. Although shafts 110a and 110b can be moved independently, such movement also adjusts or changes distance D in most cases. However, it is to be understood that positional changes of both shafts 110a and 110b of the same amount and in the same direction may ultimately result in maintaining the same distance D between the shafts 110a, 110b.

Rods 116 pass through apertures 144 in plates 118. Adjustment in an exemplary embodiment is accomplished by threading nuts 114 along rods 116 against mounting plates 118. Providing two separate bearing shafts 110a, 110b allows for independent adjustment of the tension of the two conveyor belt sides 56a, 56b. In the illustrated embodiment, bearing shaft 110a rotates on bearings 120a mounted on rails 122a in plates 124a. Similarly, bearing shaft 110b rotates on bearings 120b carried on rails 122b, which are in turn mounted on plates 124b. Grooves 126 in top and bottom surfaces (grooves in bottom surfaces not shown) of bearing housings 122 allow the bearing housings 122 to move within rails 124 only in directions 112.

FIG. 9 is a top view of a portion of an inside of spreader 20, showing the locations on which conveyor belts 56a, 56b would be positioned; however, the conveyor belts themselves are not shown to allow a view of the components of take-up bearing assembly 108. In the illustrated embodiments, plates 124 of take-up assembly 108 are mounted on sidewalls 72 of spreader 20. When conveyor belts 56a, 56b are wrapped at least partially around their respective first and second sprockets 57a, 57b, a portion of the outward conveyor belt 56a and a portion of the inward conveyor belt 56b are aligned alongside each other in a plane substantially parallel to the axes of rotation 142a, 142b.

Figure 10:
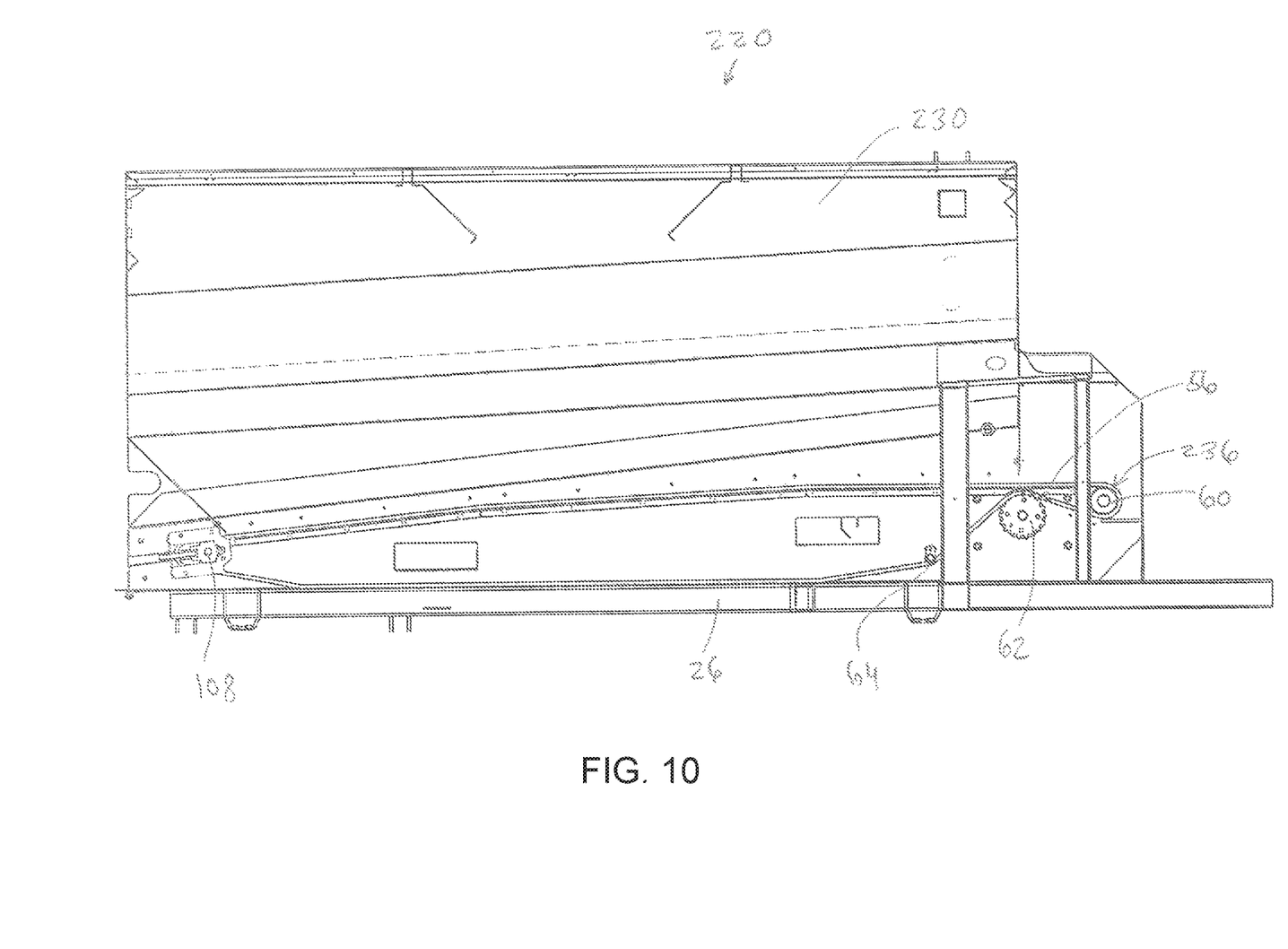
FIG. 10 is a side elevation view of a second exemplary spreader apparatus having a single tank compartment and thus only a single level of a conveyor belt assembly.

FIG. 10 is a side elevation view of a second exemplary spreader 220 having a tank 230 with a single compartment therein, rather than the dual compartments 32, 34 of spreader 20. Accordingly, only a lower conveyor assembly 236 is used in each of the left and right sides of spreader 220. In other aspects, spreader 220 is similar to spreader 20, allowing independent control of application rates of the particulate material in tank 230 through four boom portions, and analogous parts are similarly labeled.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:
1. An assembly comprising:
  a first shaft having a first end, a second end, the first shaft being rotatable about a first longitudinal axis of rotation with a first bearing positioned proximate the first end of the first shaft, and a second bearing proximate the second end of the first shaft;

a first sprocket attached to the first shaft proximate the first end of the first shaft, wherein the first sprocket rotates with the first shaft about the first longitudinal axis of rotation;

a second shaft spaced from the first shaft by a distance, the second shaft having a first end spaced from the first end of the first shaft by the distance, a second end spaced from the second end of the first shaft by the distance, the second shaft being rotatable about a second longitudinal axis of rotation that is substantially parallel to the first longitudinal axis of rotation with a third bearing positioned proximate the first end of the second shaft, and a fourth bearing proximate the second end of the second shaft;

a second sprocket attached to the second shaft proximate the second end of the second shaft, wherein the second sprocket rotates with the second shaft about the second longitudinal axis of rotation;

a first conveyor belt configured to wrap at least partially around the first sprocket;

a second conveyor belt configured to wrap at least partially around the second sprocket, the second conveyor belt configured to move independently from the first conveyor belt, wherein a portion of the first conveyor belt and a portion of the second conveyor belt are aligned alongside each other in a plane substantially parallel to the first longitudinal axis of rotation;

a first pair of plates configured to receive the first shaft, the first pair of plates comprising a first plate that receives the first bearing and a second plate that receives the second bearing; and a second pair of plates configured to receive the second shaft, the second pair of plates comprising a third plate that receives the third bearing and a fourth plate that receives the fourth bearing, wherein the first plate and the third plate are adjacent each other on a side of the first conveyor belt opposite the second conveyor belt and the second plate and the fourth plate are adjacent each other on a side of the second conveyor belt opposite the first conveyor belt;

wherein the distance is adjustable.

2. The assembly of claim 1, wherein each of the first, second, third and fourth bearings further comprises a housing connected to each of the bearings.

3. The assembly of claim 2 further comprising a rail connected to the housing of each of the first, second, third and fourth bearings.

4. The assembly of claim 3 wherein each housing is movable with respect to the respective rail.

5. The assembly of claim 4 wherein each of the first, second, third and fourth plates comprises an aperture, the assembly further comprising a rod attached to the housing and passing through the aperture, wherein movement of the rod relative to the plate corresponds to movement of the housing relative to the rail.

6. The assembly of claim 4, wherein the housing comprises a groove configured to accept a portion of the rail.

* * * * *